(12) United States Patent
Nakamura et al.

(10) Patent No.: US 7,712,902 B2
(45) Date of Patent: May 11, 2010

(54) PROJECTOR

(75) Inventors: Junichi Nakamura, Shiojiri (JP);
Takashi Nitta, Chino (JP); Shoichi Uchiyama, Shimosuwa-machi (JP);
Tsunemori Asahi, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 1083 days.

(21) Appl. No.: 11/387,859

(22) Filed: Mar. 24, 2006

(65) Prior Publication Data
US 2006/0215130 A1     Sep. 28, 2006

(30) Foreign Application Priority Data
Mar. 24, 2005   (JP)   ............... 2005-085838
Oct. 31, 2005   (JP)   ............... 2005-316276
Feb. 7, 2006    (JP)   ............... 2006-029343

(51) Int. Cl.
G03B 21/14   (2006.01)

(52) U.S. Cl. ................ 353/30; 353/20; 349/5

(58) Field of Classification Search ............ 353/33, 353/22, 20, 84, 81, 30, 88, 97; 349/18, 57, 349/58, 96–99, 5–9; 348/751–757
See application file for complete search history.

(56) References Cited

U.S. PATENT DOCUMENTS

| | | | |
|---|---|---|---|
| 5,975,704 A * | 11/1999 | Basey ................... | 353/20 |
| 5,978,142 A | 11/1999 | Blackham et al. | |
| 7,070,284 B2 * | 7/2006 | Tanaka et al. ............ | 353/84 |
| 7,070,285 B2 * | 7/2006 | Wu ...................... | 353/97 |
| 7,175,279 B2 * | 2/2007 | Drazic et al. ............ | 353/31 |
| 7,234,822 B2 * | 6/2007 | Uchiyama et al. ........ | 353/102 |
| 7,431,460 B2 * | 10/2008 | Hall et al. .............. | 353/30 |
| 7,453,475 B2 * | 11/2008 | Nitta et al. ............. | 345/690 |
| 2005/0174495 A1 * | 8/2005 | Itoh et al. .............. | 348/758 |
| 2006/0203202 A1 * | 9/2006 | Uchiyama et al. ........ | 353/31 |

FOREIGN PATENT DOCUMENTS

| | | |
|---|---|---|
| JP | A 2000-347295 | 12/2000 |
| JP | A-2001-100689 | 4/2001 |
| JP | A-2004-523001 | 7/2004 |
| JP | A-2005-250440 | 9/2005 |

* cited by examiner

Primary Examiner—William C Dowling
(74) Attorney, Agent, or Firm—Oliff & Berridge, PLC

(57) ABSTRACT

A projector includes: a first light modulation device that modulates illumination light; a second light modulation device that further modulates the illumination light modulated by the first light modulation device; a projection unit that projects the modulated illumination light toward a screen; and an optical device moving unit that moves an optical device blocking at least part of the illumination light relatively to a light path of the illumination light to move the device off the light path in response to an external request.

5 Claims, 15 Drawing Sheets

PROJECTOR

BACKGROUND

1. Technical Field

The present invention relates to a projector.

2. Related Art

These days, image quality improvement in electronic display apparatuses such as an LCD (Liquid Crystal Display), an EL (Electro-luminescence) display, a plasma display, a CRT (Cathode Ray Tube), and a projector is remarkable and performance comparable to the human visual properties is being realized with respect to resolution and color gamut. However, with respect to the brightness dynamic range, its reproduced range remains on the order of 1 to $10^2$ [nit], and further, the number of gradations is generally 8 bits. On the other hand, the human visual perception provides a brightness dynamic range that can be perceived at a time on the order of $10^{-2}$ to $10^4$ [nit], and further, the brightness discriminative ability is on the order of 0.2 [nit]. This is said to be equal to 12 bits in terms of number of gradations. Seeing a display image of a current display apparatus through such visual properties, the human does not satisfy the reality and impact of the display image because the narrowness of the brightness dynamic range stands out and additionally, the gradations in shadow parts and highlight parts are insufficient.

Further, in computer graphics (CG) used for movies or games, the movement for pursuing description reality by providing display data (hereinafter, referred to as "HDR (High Dynamic Range) display data") with brightness dynamic range and gradation characteristics close to human visual perception is becoming the mainstream. However, there is a problem that powers of expression the CG contents originally have can not be exerted sufficiently because the performance of the display apparatus for displaying CG is insufficient.

Furthermore, in the next OS (Operative System), 16-bit color space is planned to be adopted, and the brightness dynamic range and the number of gradations will be increased dramatically compared to those in the current 8-bit color space. Accordingly, the demand for realization of an electronic display apparatus with high dynamic range and high gradation capable of utilizing the 16-bit color space is expected to be increased.

Among display apparatuses, projection display apparatuses (projectors) such as a liquid crystal projector and DLP (Digital Light Processing, registered trademark) projector can perform large screen display and are effective display apparatuses for reproducing the reality and impact of display images. In this field, the following proposals have been made in order to solve the above described problems.

As a display apparatus with high dynamic range, for example, there is a technology disclosed in JP-T-2004-523001 and JP-A-2001-100689. In the technology, a light source, a second light modulation device for modulating brightness of all wavelength regions of light, and a first light modulation device for modulating the brightness of the wavelength regions with respect to respective wavelength regions of RGB three primary colors of the wavelength regions of light are provided for forming a desired brightness distribution by modulating light from the light source by the second light modulation device, imaging the optical image thereof onto a display surface of the first light modulation device and performing color modulation, and projecting the secondarily modulated light. The respective pixels of the second light modulation device and the first light modulation device are separately controlled based on the first control value and the second control value determined from the HDR display data, respectively. As the light modulation device, a transmissive modulation device having a pixel structure or segment structure with independently controllable transmittances and capable of controlling a two-dimensional transmittance distribution is used. As a representative example thereof, a liquid crystal light valve is cited. Further, a reflective modulation device may be used in place of the transmissive modulation device, and as a representative example thereof, a micromirror array device is cited.

Now, the case of using a light modulation device having a transmittance of 0.2% of dark display and a transmittance of 60% of light display is considered. Regarding the light modulation device alone, the brightness dynamic range is 60/0.2=300. The display apparatus corresponds to the case where light modulation devices having the brightness dynamic range of 300 are optically and serially arranged, and thereby, the brightness dynamic range of 300×300=90000 can be realized. Further, the equal way of thinking is held with respect to the number of gradations, and the number of gradations exceeding 8 bits can be obtained by optically and serially arranging light modulation devices with 8-bit gradation.

By the way, in a projector with high dynamic range, light is modulated by serially provided two light modulation devices, and a problem that the amount of light finally output from projecting means becomes smaller and the brightness of the display image becomes lower arises. At present, it is assumed that the projector with high dynamic range is used when image display is mainly performed in dark environments as is the case of cinema contents or the like. Accordingly, the above described brightness reduction of display image due to serially provided two light modulation devices is not so much acknowledged as a problem.

However, in the future, there is a possibility that the projector with high dynamic range is used when image display is performed in bright environments as is the case of data contents or the like. In this case, the brightness of display image is likely to be insufficient by the brightness reduction of display image due to serially provided two light modulation devices.

SUMMARY

An advantage of some aspects of the invention is to provide a projector that changes display characteristics according to a use environment.

A projector according to an aspect of the invention includes: a first light modulation device that modulates illumination light; a second light modulation device that further modulates the illumination light modulated by the first light modulation device; a projection unit that projects the modulated illumination light toward a screen; and an optical device moving unit that moves an optical device blocking at least part of the illumination light relatively to a light path of the illumination light to move the device off the light path in response to an external request.

According to the projector, the optical device is moved off by being relatively moved from the light path of the illumination light in response to the external request. Accordingly, the display characteristics of the projector can be changed in either case of relatively moving the optical device from the light path or not. In the projector, since the optical device blocks at least part of the illumination light, the display characteristic of the projector becomes brighter when the optical device is relatively moved from the light path. When the optical device is not relatively moved from the light path, the display characteristic of the projector becomes slightly darker, but other display characteristics depending on the optical device are improved. Therefore, according to the projector, the display characteristics can be changed according to the use environment.

Note that what is directly moved for moving the optical device off the light path may be either the optical path or the light path of the illumination light. That is, according to an aspect of the invention, a configuration in which the optical device moving unit moves the optical device relatively to the light path of the illumination light by moving the optical device may be adopted, or a configuration in which the optical device moving unit moves the optical device relatively to the light path of the illumination light by moving the light path of the illumination light may be adopted. For example, using various moving mechanisms as the optical device moving unit enables the movement of the optical device, or using mirrors and lenses as the optical device moving unit enables the movement of the light path.

Further, according to an aspect of the invention, a configuration in which the optical device is the second light modulation device may be adopted.

According to the projector, since the optical device with great light loss can be relatively moved from the light path, the display characteristic of the projector when the optical device is relatively moved from the light path can be made brighter.

Further, according to an aspect of the invention, a configuration in which the second light modulation device is a transmissive liquid crystal light valve, and the optical device is a polarizer provided to the second light modulation device may be adopted.

According to the projector, since the optical device with great light loss can be relatively moved from the light path, the display characteristic of the projector when the optical device is relatively moved from the light path can be made brighter more easily. Further, since it is not necessary to arrange the polarizer precisely as is the case of the second light modulation device and the light path of illumination light, when the polarizer is returned after moved, it can be returned relatively easily.

In the case where the second light modulation device is a transmissive liquid crystal light valve and the optical device is a polarizer, it is preferable that a configuration including a controller that turns the full area of a liquid crystal panel provided to the second light modulation device white when the optical device is moved off the light path may be adopted.

According to the projector, since the illumination light is transmitted through the liquid crystal panel with little loss, the display characteristic of the projector can be made brighter more reliably.

Further, according to an aspect of the invention, a configuration in which the optical device is a wavelength selective retardation film that aligns a polarization direction of the illumination light modulated by the first light modulation device in a polarization direction incident to the second light modulation device may be adopted.

For example, in the case of a 3-LCD projector in which illumination lights of the respective colors of RGB are modulated by three first light modulation devices, sometimes the polarization directions of the illumination lights modulated by the respective first light modulation devices are not unified. On this account, when the illumination lights modulated by the respective first light modulation devices are combined and entered into the second light modulation device, it is necessary to unify the polarization directions of the illumination lights modulated by the respective first light modulation devices. Specifically, the retardation film having wavelength selectivity (wavelength selective retardation film) is provided between the first light modulation device and the second light modulation device. The retardation film having wavelength selectivity acts as a retardation film only on light with a predetermined wavelength, and does not act as a retardation film on lights with other wavelengths. The film can unify the polarization direction of the illumination light entering the second light modulation device by using the above described light with a predetermined wavelength as illumination light in a shifted polarization direction among the respective illumination lights modulated by the respective first light modulation devices.

However, the illumination light loses some energy when it passes through the wavelength selective retardation film. Specifically, when the illumination light passes through the wavelength selective retardation film, part of the illumination light turns into heat and the intensity as the entire illumination light is reduced. Therefore, in the case where the second light modulation device is moved off the light path of the illumination light, that is, in the case where the wavelength selective retardation film is not required, display images can be made brighter by moving the wavelength selective retardation film as well off the light path. As described above, in the projector, sometimes the wavelength selective retardation film is not required.

Therefore, according to the projector, since the configuration in which the optical device that can be moved off the light path by the optical device moving unit is the wavelength selective retardation film is adopted, the display images can be made brighter in the case where the wavelength selective retardation film is not required.

Specifically, according to an aspect of the invention, a configuration in which the second light modulation device brightness-modulates the illumination light may be adopted. According to the projector, the display characteristic of the projector can be made to have a high dynamic range in the case where the second optical modulation device is not relatively moved from the light path of the illumination light.

Further, according to an aspect of the invention, a configuration including a focal point adjustment unit that adjusts a focal distance of the projection unit when the optical device is moved off the light path may be adopted.

According to the projector, the focal distance of the projection unit can be adjusted according to the change of the focal point when the optical device is moved off the light path. Therefore, even when the optical device is moved off the light path, focused images can be displayed on the screen.

It is preferable that the projector may adopt a configuration in which the focal point adjustment unit adjusts the focal distance by performing adjustment within the projection unit may be adopted. According to the projector, the focal distance of the projection unit can be adjusted without moving the projection unit itself.

Further, according to an aspect of the invention, a configuration including a light path length adjustment unit that adjusts a light path length of the illumination light when the optical device is moved off the light path may be adopted.

According to the projection, the light path length of the illumination light can be changed according to the change of the focal length, i.e., the change of light path length when the optical device is moved off the light path. Therefore, even when the optical device is moved off the light path, focused images can be displayed on the screen.

Specifically, the light path length adjustment unit includes a light path length adjustment optical device to be inserted into the light path when the optical device is off the light path of the illumination light, and the unit can adjust the light path length of the illumination light. Further, optical glass or dielectric multilayer glass may be used as the light path length adjustment optical device.

Furthermore, it is preferable that the projector adopts a configuration in which the light path length adjustment optical device and the optical device are integrally formed. According to the projector, the light path length adjustment optical device can be moved simultaneously with movement of the optical device by the optical device moving unit.

It is preferable that, in the case where the light path length adjustment optical device and the optical device are integrally formed, a configuration in which the light path length adjustment optical device and the optical device are integrally formed by bonding the optical device to the light path length adjustment optical device, and the optical device is bonded to a step portion formed in the light path length adjustment optical device may be adopted. According to the projector, the optical path via the optical path and the optical path via the light path length adjustment optical device only can be easily adjusted by adjusting the height of the step portion.

Further, according to an aspect of the invention, a configuration in which the optical device is the first light modulation device may be adopted.

According to the projector, since the optical device with great light loss can be relatively moved from the light path, the display characteristic of the projector when the optical device is relatively moved from the light path can be made brighter.

Furthermore, according to an aspect of the invention, a configuration in which the first light modulation device is a transmissive liquid crystal light valve, and the optical device is a polarizer provided to the first light modulation device may be adopted.

According to the projector, since the optical device with great light loss can be moved off the light path, the display characteristic of the projector when the optical device is moved off the light path can be made brighter more easily. Further, since it is not necessary to arrange the polarizer precisely as is the case of the first light modulation device itself and the light path of illumination light, when the polarizer is returned after moved, it can be returned relatively easily.

Specifically, according to an aspect of the invention, a configuration in which the first light modulation device brightness-modulates the illumination light may be adopted. According to the projector, the display characteristic of the projector can be made to have a high dynamic range in the case where the first optical modulation device is not relatively moved from the light path of the illumination light.

Further, according to an aspect of the invention, a configuration in which the first light modulation device and the second light modulation device are liquid crystal light valves, and the optical device is a light incident-side polarizer provided to the second light modulation device may be adopted.

In the case where the first light modulation device is a liquid crystal light valve, the polarization direction of the light output from the first light modulation device is aligned nearly in one direction. Accordingly, in the case where the polarization direction is in parallel with the transmission axis of the light incident-side polarizer of the second light modulation device, the light incident-side polarizer is not required.

Therefore, according to the projector, since the optical device with great light loss can be moved off the light path, the display characteristic of the projector can be made brighter.

Further, according to an aspect of the invention, a configuration including a signal processor that changes signal processing for driving the first light modulation device or/and the second light modulation device when the optical device is moved off the light path may be adopted.

According to the projector, even when the optical device is moved off the light path, the first light modulation device and the second light modulation device can be preferably driven and good display characteristics can be obtained.

Specifically, a configuration in which the signal processor changes the signal processing by changing a look-up table itself or changing a reference address within the look-up table may be adopted.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
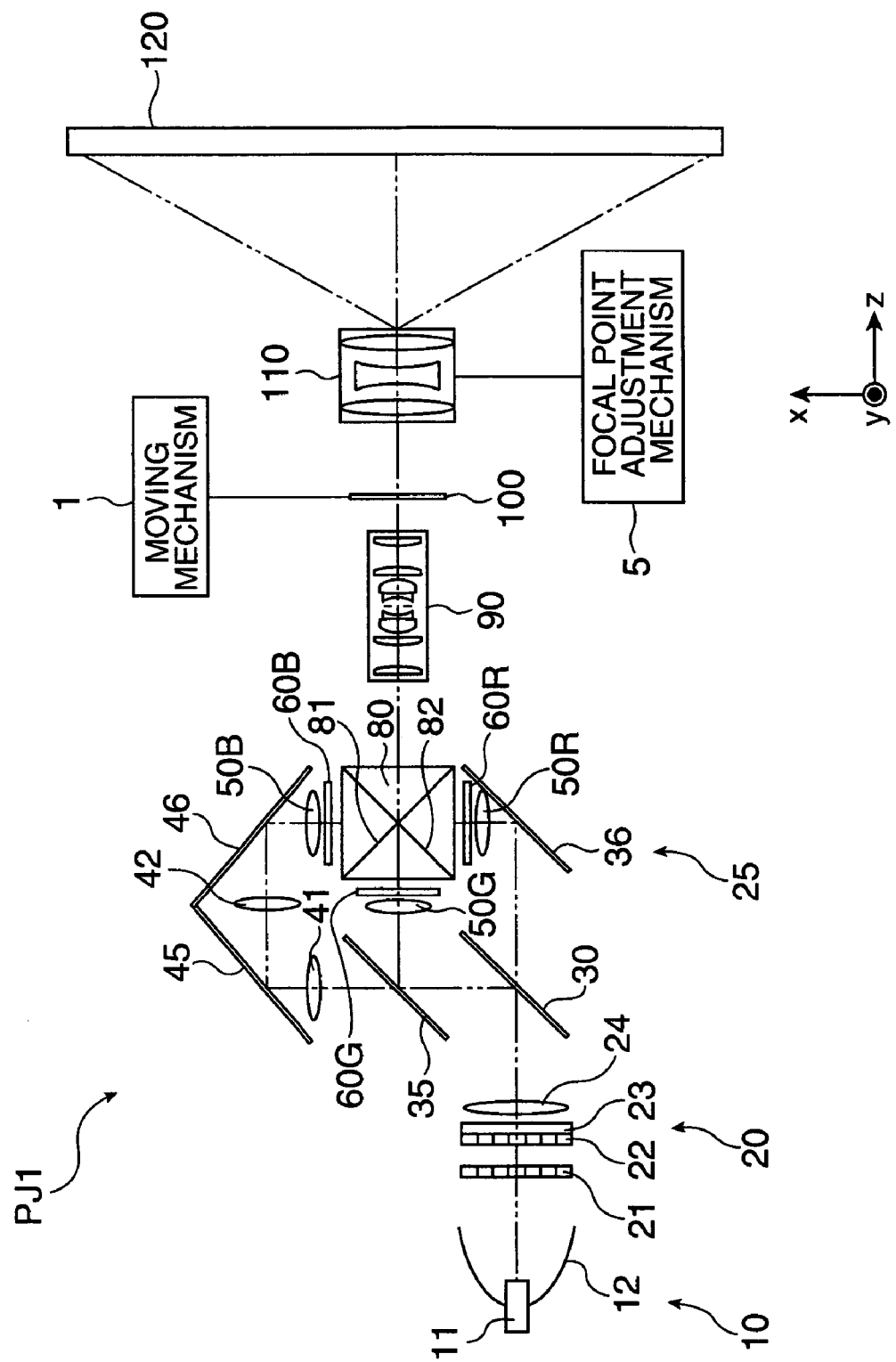
FIG. 1 shows a main optical configuration of a projector in the first embodiment of the invention.

Hereinafter, one embodiment of a projector according to the invention will be described by referring to the drawings. In the drawings, the reduction scales of the respective members are appropriately changed to provide recognizable sizes of the respective members.

First Embodiment

FIG. 1 shows a main optical configuration of projector PJ1 of the embodiment.

The projector PJ1 includes an image display apparatus having a light source 10, a uniform illumination system 20 that uniformizes the brightness distribution of light (illumination light) incident from the light source 10, a color modulating unit 25 that respectively modulates the brightness of RGB three primary colors in the wavelength regions of the light incident from the uniform illumination system 20, a relay lens 90 that relays the light incident from the color modulating unit 25, and a liquid crystal light valve 100 that modulates the brightness of all wavelength regions of the light incident from the relay lens 90, and a projection lens 110 that projects the light incident from the liquid crystal light valve 100 onto a screen 120.

Further, the light source 10 includes a lamp 11 of an ultra-high pressure mercury lamp, xenon lamp, or the like, and a reflector 12 that reflects and condenses the light output from the lamp 11.

In the description as below, in the xyz orthogonal coordinate system of the entire optical system, the pixel plane of the liquid crystal light valve 100 is xy plane, and the direction of the light output from a cross dichroic prism 80 toward the projection lens 110 is z direction.

The uniform illumination system 20 includes first and second lens arrays 21 and 22 of fly-eye lenses or the like, a polarization conversion element 23, and a condenser lens 24. The system uniformizes the brightness distribution of the light output from the light source 10 by the first and second lens arrays 21 and 22, polarizes the light that has passed through the first and second lens arrays 21 and 22 in a polarization direction incidentable to the color modulating unit by the polarization conversion element 23, condenses the polarized light by the condenser lens 24, and outputs the light to the color modulating unit 25. The polarization conversion element 23 is formed by a PBS array and a half-wave plate for converting randomly polarized light into specific linearly polarized light.

The color modulating unit 25 includes two dichroic mirrors 30 and 35 as light separators, three mirrors (reflection mirrors 36, 45, and 46), five field lenses (a lens 41, a relay lens 42, and parallelizing lenses 50B, 50G, and 50R), three liquid crystal light valves 60R, 60G, and 60B, and a cross dichroic prism 80.

The dichroic mirrors 30 and 35 are for separating (spectroscopically separating) the light (white light) from the light source 10 into RGB three primary color lights of red (R), green (G), and blue (B). The dichroic mirror 30 includes a dichroic film having a nature of reflecting B light and G light and transmitting R light formed on a glass plate or the like, and, with respect to the white light from the light source 10, reflects B light and G light and transmits R light, which are contained in the white light. The dichroic mirror 35 includes a dichroic film having a nature of reflecting G light and transmitting B light formed on a glass plate or the like, and reflects the G light of the G light and B light transmitted through the dichroic mirror 30 and transfers the light to the parallelizing lens 50G and transmits and transfers the blue light to the lens 41.

The relay lens 42 is for transferring light in the vicinity of the lens 41 to the vicinity of the parallelizing lens 50B, and the lens 41 has a function of allowing light efficiently enter the relay lens 42. Further, the B light incident to the lens 41 is transferred to the spatially separated liquid crystal light valve 60B in a condition in which the intensity distribution thereof is nearly completely conserved with little light loss.

The parallelizing lenses 50B, 50G, and 50R have a function of substantially parallelizing the respective color lights incident to the corresponding liquid crystal light valves 60R, 60G, and 60B to enter the lights transmitted through the liquid crystal light valves 60R, 60G, and 60B into the relay lens 90. Then, the RGB three primary color lights spectroscopically separated by the dichroic mirrors 30 and 35 enter the liquid crystal light valves 60R, 60G, and 60B via the above described mirrors (reflection mirrors 36, 45, and 46) and lenses (lens 41, relay lens 42, and parallelizing lenses 50B, 50G, and 50R).

The liquid crystal light valves 60R, 60G, and 60B are active matrix liquid crystal display devices including TN type liquid crystal sandwiched between a glass substrate on which pixel electrodes and switching elements for driving the electrodes such as thin film transistor elements and thin film diodes are formed in a matrix form and a glass substrate on which a common electrode is formed over the entire surface, and polarizers disposed on the outer surfaces thereof.

Further, the liquid crystal light valves 60R, 60G, and 60B are driven in the normally white mode in which they take white/light (transmitting) condition when no voltage is applied and black/dark (non-transmitting) condition when a voltage is applied, or driven in the normally black mode as the inverse mode thereof. The gradation between light and dark is analog controlled according to the provided control values. The liquid crystal light valve 60B performs light modulation on the incident B light based on the display image data and outputs the modulated light including an optical image. The liquid crystal light valve 60G performs light modulation on the incident G light based on the display image data and outputs the modulated light including an optical image. The liquid crystal light valve 60R performs light modulation on the incident R light based on the display image data and outputs the modulated light including an optical image.

The cross dichroic prism 80 has a structure in which four right angle prisms are bonded, and, within the structure, a dielectric multilayer film reflecting B light (B light reflection dichroic film 81) and a dielectric multilayer film reflecting R light (R light reflection dichroic film 82) are formed to have an X-shaped section. The prism transmits the G light from the liquid crystal light valve 60G and bends the R light from the liquid crystal light valve 60R and the B light from the liquid crystal light valve 60B, and combines these three color lights to form a color image.

Figure 2:
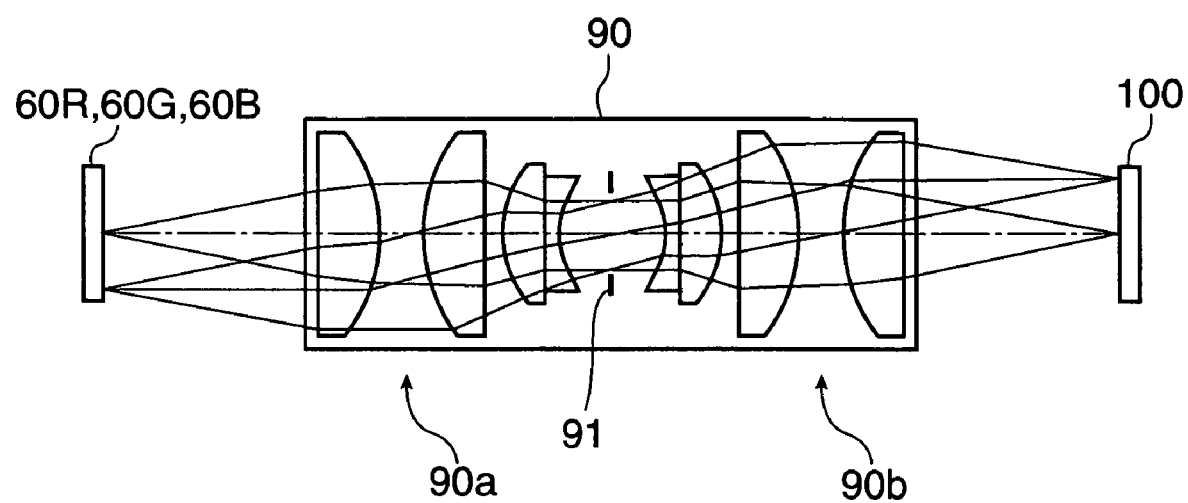
FIG. 2 shows a configuration of a relay lens.

FIG. 2 shows a configuration of the relay lens 90.

The relay lens 90 is for transferring the optical image from the liquid crystal light valves 60R, 60G, and 60B combined by the cross dichroic prism 80 onto the pixel plane of the liquid crystal light valve 100. Further, the relay lens 90 used in the embodiment is an inverted imaging unit, and the image output from the liquid crystal light valves 60R, 60G, and 60B and formed in the liquid crystal light valve 100 via the relay lens 90 is an inverted image.

Note that, in the relay lens 90 shown in FIG. 2, the cross dichroic prism 80 between the liquid crystal light valves 60R, 60G, and 60B and the relay lens 90 is omitted for ease of explanation, however, the relay lens is optically equal to the configuration of the projector PJ1 shown in FIG. 1.

The relay lens 90 is an equal magnification imaging lens including a former part lens group 90a and a latter part lens group 90b disposed nearly asymmetrically relative to an aperture stop 91. Further, in consideration of viewing angle characteristics of liquid crystal, the lens desirably has a both-side telecentric property. In such a relay lens 90, the image side focal position of the former part lens group 90a, the aperture stop 91, and the object side focal position of the latter part lens group 90b are set in the same position, and the liquid crystal light valves 60R, 60G, and 60B are provided in the object side focal position of the former part lens group 90a and the liquid crystal light valve 100 is provided in the image side focal position of the latter part lens group 90b. The former part lens group 90a and latter part lens group 90b include plural convex lenses and concave lenses. Note that the shape, size, arrangement spacing, and number, telecentricity, magnification of lenses, and other lens properties can be appropriately changed according to the required properties and not limited to the example in FIG. 2.

Further, the liquid crystal light valve 100 modulates the brightness of all wavelength regions of incident light based on display image data and outputs the modulated light containing a final optical image to the projection lens 110.

Figure 3:
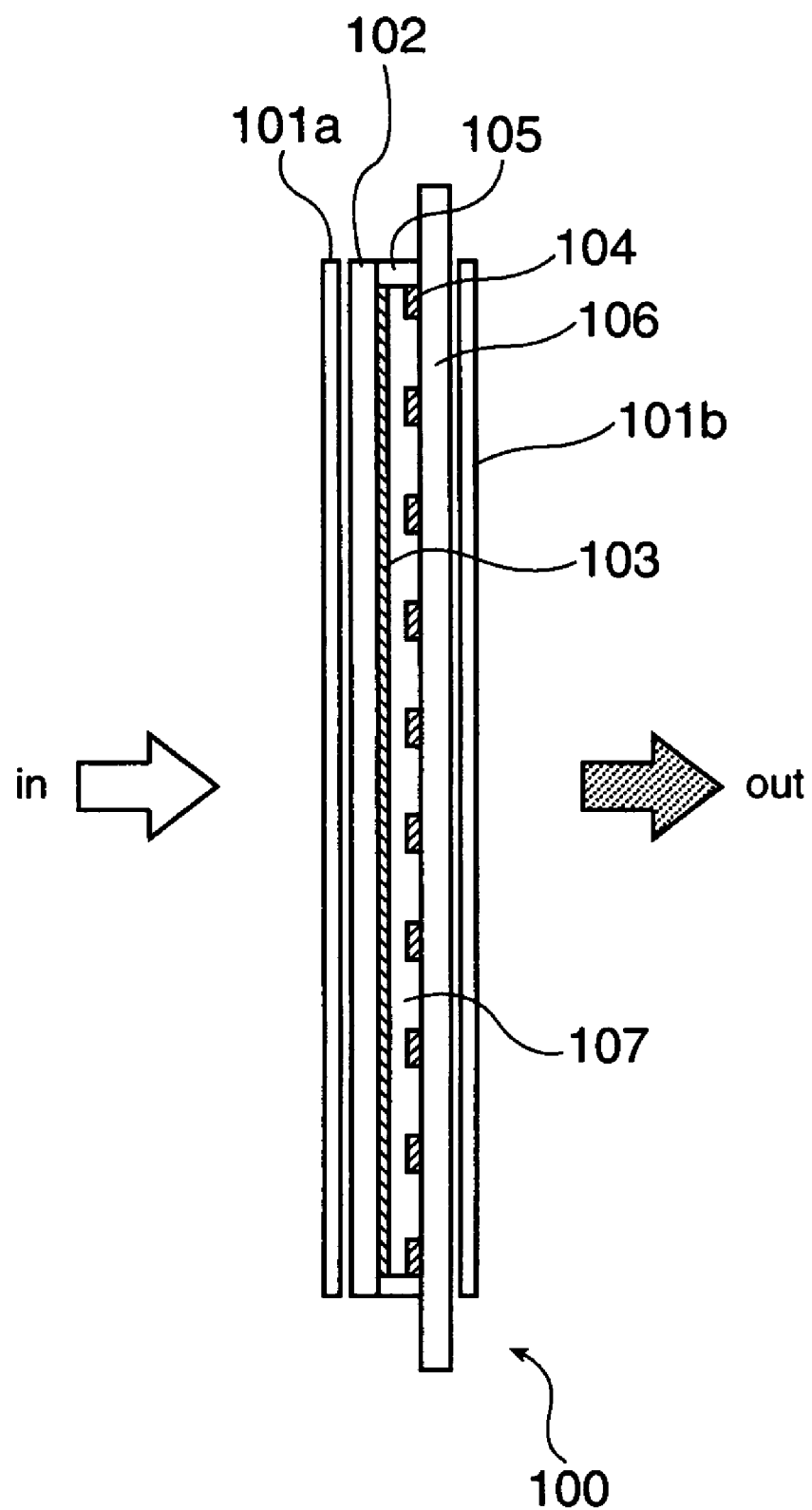
FIG. 3 is a sectional view of a liquid crystal light valve.

FIG. 3 is a sectional view of the liquid crystal light valve 100. As shown in the drawing, the liquid crystal light valve 100 has a sandwich structure in which a liquid crystal panel is sandwiched by a polarizer 101a (optical device) and a polarizer 101b (optical device). The liquid crystal panel includes an opposite substrate 102, an opposite electrode 103, data wiring 104, a sealing material 105, a TFT (thin-film transistor) substrate 106, and a liquid crystal material layer 107 as shown in FIG. 3.

In such a liquid crystal light valve 100, light through the relay lens 90 enters from the "in" side of the drawing and the incident light is brightness-modulated and output to the "out" side of the drawing.

Then, as shown in FIG. 1, in the projector PJ1 of the embodiment, a moving mechanism 1 (an optical device moving unit) for moving the polarizers 101a and 101b provided in the liquid crystal light valve 100 is coupled to the liquid crystal light valve 100.

Figure 4:
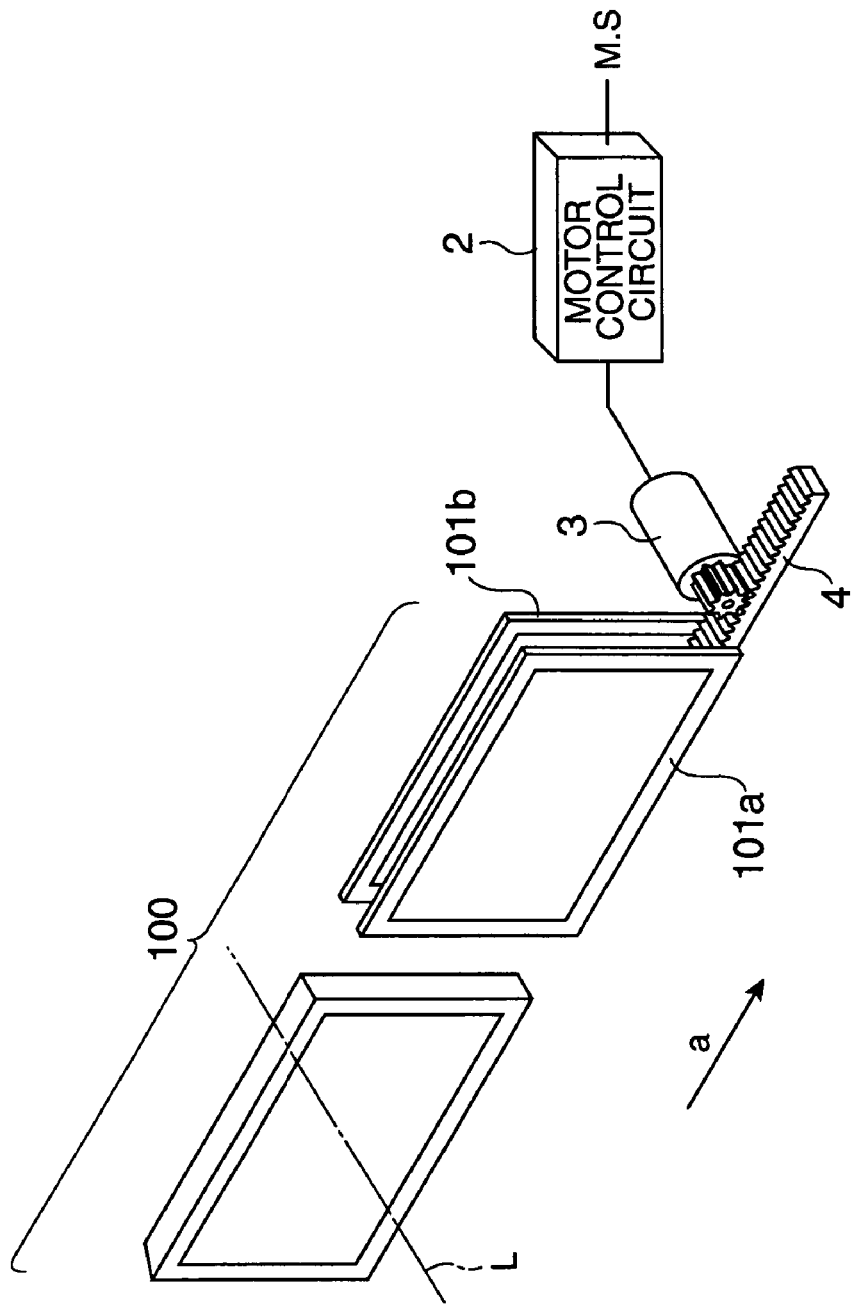
FIG. 4 shows a schematic configuration of a moving mechanism.

FIG. 4 shows a schematic configuration of the moving mechanism 1. As shown in the drawing, the moving mechanism 1 includes a motor 3, a motor control circuit 2 that drives the motor 3 according to external signals (M.S), and a slide gear 4 connected to the polarizers 101a and 101b provided in the liquid crystal light valve 100 and moved in "a" direction in the drawing by the motor 3. When the motor 3 is driven by the motor control circuit 2, the slide gear 4 is moved in "a" direction, and thereby, the polarizers 101a and 101b coupled to the slide gear 4 are moved off (moved relatively to) light path L of the light. Further, when the motor 3 is driven into reverse rotation by the motor control circuit 2, the polarizers 101a and 101b are moved to sandwich the liquid crystal panel again.

The projection lens 110 projects the optical image formed on the display surface of the liquid crystal light valve 100 onto the screen 120 to display a color image.

In the projector of the embodiment, a focal point adjustment mechanism 5 (focal point adjustment unit) for changing the focal distance of the projection lens 110 is connected to the projection lens 110.

The focal point adjustment mechanism 5 is for changing the focal distance of the projection lens 110 according to the change of the focal point produced when the above described moving mechanism 1 moves the polarizers 101a and 101b of the liquid crystal light valve 100.

Here, the liquid crystal light valves 60R, 60G, and 60B and liquid crystal light valve 100 are the same in the point where they modulate intensity of transmitted light and include optical images in response to the degrees of the modulation, however, they are different in the point where the latter liquid crystal light valve 100 modulates light of all wavelength regions (white light), while the former liquid crystal light valves 60R, 60G, and 60B modulate lights of specific wavelength regions (color lights of R, G, and B or the like) spectroscopically separated by the dichroic mirrors 30 and 35 as the light separating units. Therefore, for convenience, they are discriminated by referring to the light intensity modulation performed by the liquid crystal light valves 60R, 60G, and 60B as color modulation and the light intensity modulation performed by the liquid crystal light valve 100 as brightness modulation.

Further, from the same point of view, in the description as below, sometimes they are discriminated by referring to the liquid crystal light valves 60R, 60G, and 60B as color modulation light valves and the liquid crystal light valve 100 as brightness modulation light valve.

Next, the overall flow of light transfer in the projector PJ1 will be described. The white light from the light source 10 is spectroscopically separated into three primary color lights of red (R), green (G), and blue (B) by the dichroic mirrors 30 and 35, and allowed to enter the liquid crystal light valves 60R, 60G, and 60B via the lens including the parallelizing lenses 50B, 50G, and 50R and the mirrors. The respective color lights incident to the liquid crystal light valves 60R, 60G, and 60B are color modulated based on external data depending on the respective wavelength regions, output as modulated lights including optical images. The modulated lights from the liquid crystal light valves 60R, 60G, and 60B respectively enter the cross dichroic prism 80, and are combined into one light there.

Then, the beam output from the cross dichroic prism 80 is entered into the liquid crystal light valve 100 via the relay lens 90. The combined light incident to the liquid crystal light valve 100 is brightness modulated based on the external data depending on all wavelength regions, and output to the projection lens 110 as modulated light including the final optical image. Then, in the projection lens 110, the final combined light from the liquid crystal light valve 100 is projected onto the screen 120 to display a desired image.

Thus, in the projector PJ1, the form in which the modulated lights including the optical images (images) formed by the liquid crystal light valves 60R, 60G, and 60B as the first light modulator devices are used for forming the final display image by the liquid crystal light valve 100 as the second light modulator device is adopted. The light from the light source 10 is modulated in the two stages of image forming process via the serially arranged two light modulation devices (the color modulation light valves and brightness modulation light valve). For example, an image formation process appears in Helge Seetzen, Lorne A. Whitehead, "A High Dynamic Range Display Using Low and High Resolution Modulators", SID Symposium 2003, pp. 1450-1453 (2003). As a result, the projector PJ1 can realize the expansion of brightness dynamic range and increase in number of gradations.

Further, the projector PJ1 has a display control device 200 that controls the projector PJ1.

Figure 5:
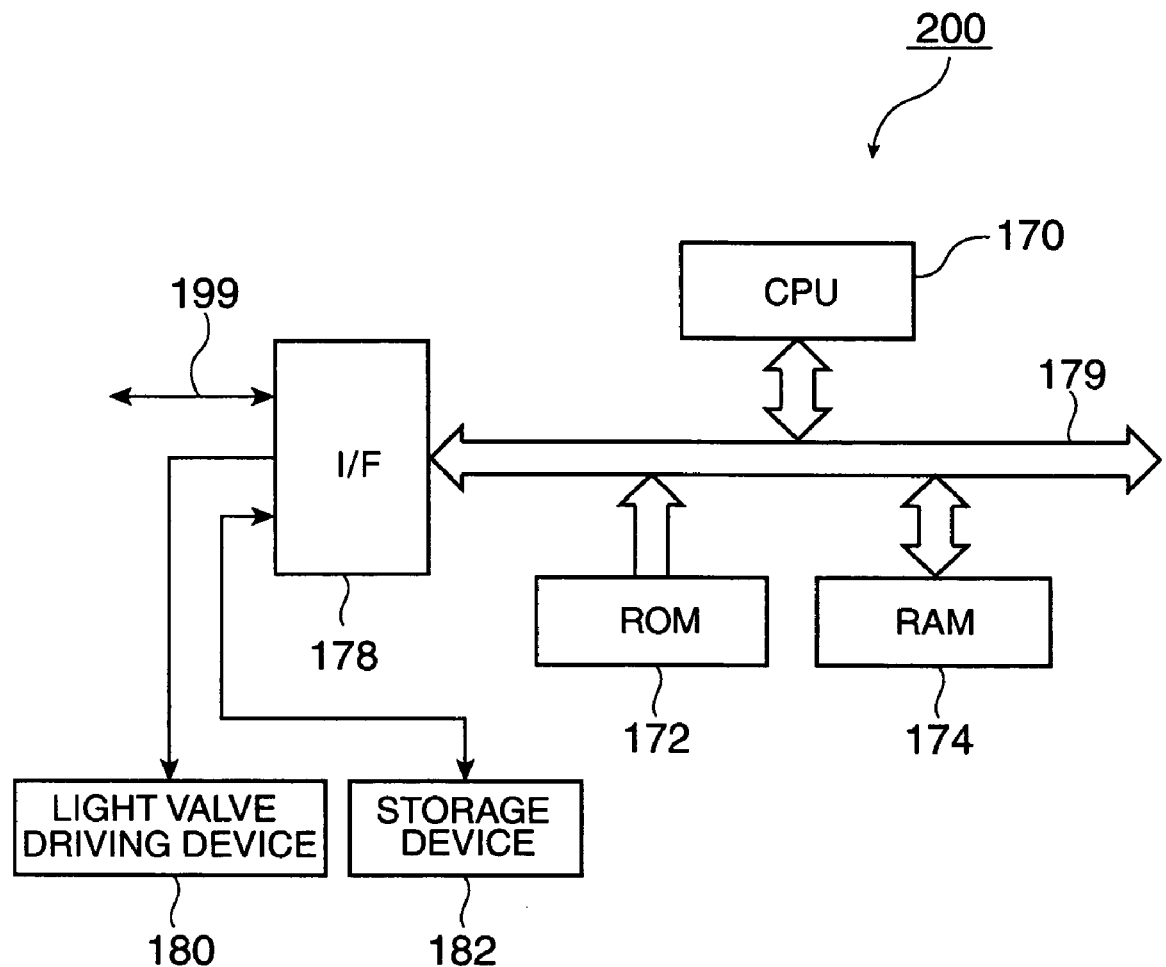
FIG. 5 shows a hardware configuration of a display control device.

FIG. 5 is a block diagram showing a hardware configuration of the display control device 200.

As shown in FIG. 5, the display control device 200 includes a CPU 170 that performs calculation and control of the entire system based on control programs, a ROM 172 that has stored the control programs of the CPU 170 etc. in a predetermined area, a RAM 174 for storing data read from the ROM 172 etc. and calculation results required in the calculation process of the CPU 170, and an I/F 178 that transmits the data input to and output from external devices, and these are connected to one another so that data can be transmitted and received by a bus 179 as a signal line for transferring data.

To the I/F 178, as external devices, a light valve driving device 180 that drives the brightness modulation light valve and color modulation light valves, a storage device 182 that stores data, tables, etc. as files, and a signal line 199 for connection to an external network are connected. In the projector PJ1 of the embodiment, the light valve driving device 180 has a function as a controller of the invention. That is, the light valve driving device 180 drives the light valve so that the full area of the liquid crystal panel of the liquid crystal light valve 100 turns white when the polarizers 101a and 101b of the liquid crystal light valve 100 are moved.

The storage device 182 has stored HDR display data, control value registration table, etc. for driving the brightness modulation light valve and color modulation light valves.

In the embodiment, the projector PJ1 controls the transmittances of the liquid crystal light valves 60R, 60G, and 60B and liquid crystal light valve 100 in the display control device 200 based on the external HDR video signals and RGB to display HDR images on the screen 120.

Here, the HDR display data is image data that can realize high brightness dynamic range, which can not be realized by the conventional image format of SRGB or the like, and the data has stored pixel values representing brightness levels of pixels with respect to all pixels. In the embodiment, as the HDR display data, a format in which pixel values with respect to each of RGB three primary colors for one pixel are stored as floating point values is used. For example, as a pixel value of one pixel, the value (1.2, 5.4, 2.3) is stored.

Further, HDR images with high brightness dynamic range are imaged and the HDR display data is generated based on the imaged HDR images.

For example, the details on the method of generating HDR image data appears in the publicly known document, P. E. Debevec, J. Malik, "Recovering High Dynamic Range Radiance Maps from Photographs", Proceedings of ACM SIGGRAPH97, p. 367-378, 1997.

In the projector PJ1 of the embodiment, for example, when instructions are issued from external networks, or a ROM in which no HDR data has been stored is set as the ROM 172, a signal indicating the fact is output from the CPU 170 in response to the external request.

Then, when the signal is input to the motor control circuit 2 of the moving mechanism 1, the motor control circuit 2 drives the motor 3 to move the slide gear 4, and thereby, the polarizers 101a and 101b of the liquid crystal light valve 100 are moved off light path L of the light. Further, the signal from the CPU 170 is also input to the focal point adjustment mechanism 5 and the light valve driving device 180 other than the moving mechanism 1. When the signal is input from the CPU 170 to the focal point adjustment mechanism 5, the mechanism adjusts the focal distance of the projection lens 110. When the signal is input from the CPU 170 to the light valve driving device 180, the device drives the liquid crystal panel of the liquid crystal light valve 100 so that the full area thereof turns white.

Further, in the projector PJ1 of the embodiment, when the polarizers 101a and 101b of the liquid crystal light valve 100 are moved off the light path L of the light, the display control device 200 changes the signal processing for driving the liquid crystal light valves 60R, 60G, and 60B to realize better display characteristics.

Specifically, a LUT (look-up table) when the polarizers 101a and 101b of the liquid crystal light valve 100 are in the light path L of the light and a LUT when the polarizers 101a and 101b of the liquid crystal light valve 100 are off the light path L of the light have been stored in the storage device 182 in advance. The signal processing for driving the liquid crystal light valves 60R, 60G, and 60B can be changed, when the LUT stored in the storage device 182 is changed by the CPU 170 according to the conditions of the polarizers 101a and 101b of the liquid crystal light valve 100.

The signal processing for driving the liquid crystal light valves 60R, 60G, and 60B can be changed if the signal processing data when the polarizers 101a and 101b of the liquid crystal light valve 100 are in the light path L of the light and the LUT when the polarizers 101a and 101b of the liquid crystal light valve 100 are off the light path L of the light have been stored as one LUT in the storage device 182, and the reference destination of the address of the LUT is changed by the CPU 170 according to the conditions of the polarizers 101a and 101b of the liquid crystal light valve 100.

Thus, in the projector PJ1 of the embodiment, the display control device 200 has a function as a signal processor of the invention.

According to the projector PJ1 of the embodiment, since the polarizers 101a and 101b as optical devices causing the greatest light loss are moved from the light path L, the display characteristics of the projector PJ1 can be made brighter.

Therefore, according to the projector of the embodiment, the display characteristics can be changed according to the use environment.

Further, since it is not necessary to arrange the polarizers 101a and 101b precisely as is the case of the liquid crystal panel and the light path of illumination light, when the polarizers are returned after they are moved by the moving mechanism 1, they can be returned relatively easily.

Furthermore, since the full area of the liquid crystal panel of the liquid crystal light valve 100 is turned white, the light is transmitted through the liquid crystal panel with little loss, and thereby, the display characteristic of the projector can be made brighter more reliably.

Moreover, since the signal processing for driving the liquid crystal light valves 60R, 60G, and 60B can be changed when the polarizers 101a and 101b of the liquid crystal light valve 100 are moved off the light path L of the light, the liquid crystal light valves 60R, 60G, and 60B can be driven preferably, and good display characteristics can be obtained.

In addition, since the focal distance of the projection lens 110 is changed by the focal point adjustment mechanism 5 according to the change of the focal point produced when the polarizers 101a and 101b are relatively moved, focused images can be displayed on the screen 120.

By the way, in the case where the polarizers 101a and 101b of the liquid crystal light valve 100 are off the light path L of the light, the full area of the liquid crystal panel is constantly white, the power consumption of the projector PJ1 can be reduced using a normally white type liquid crystal panel as the liquid crystal panel.

Further, not both of the polarizers 101a and 101b of the liquid crystal light valve 100 are moved off the light path L of the light, but either of them may be moved off the light path L.

Figure 6:
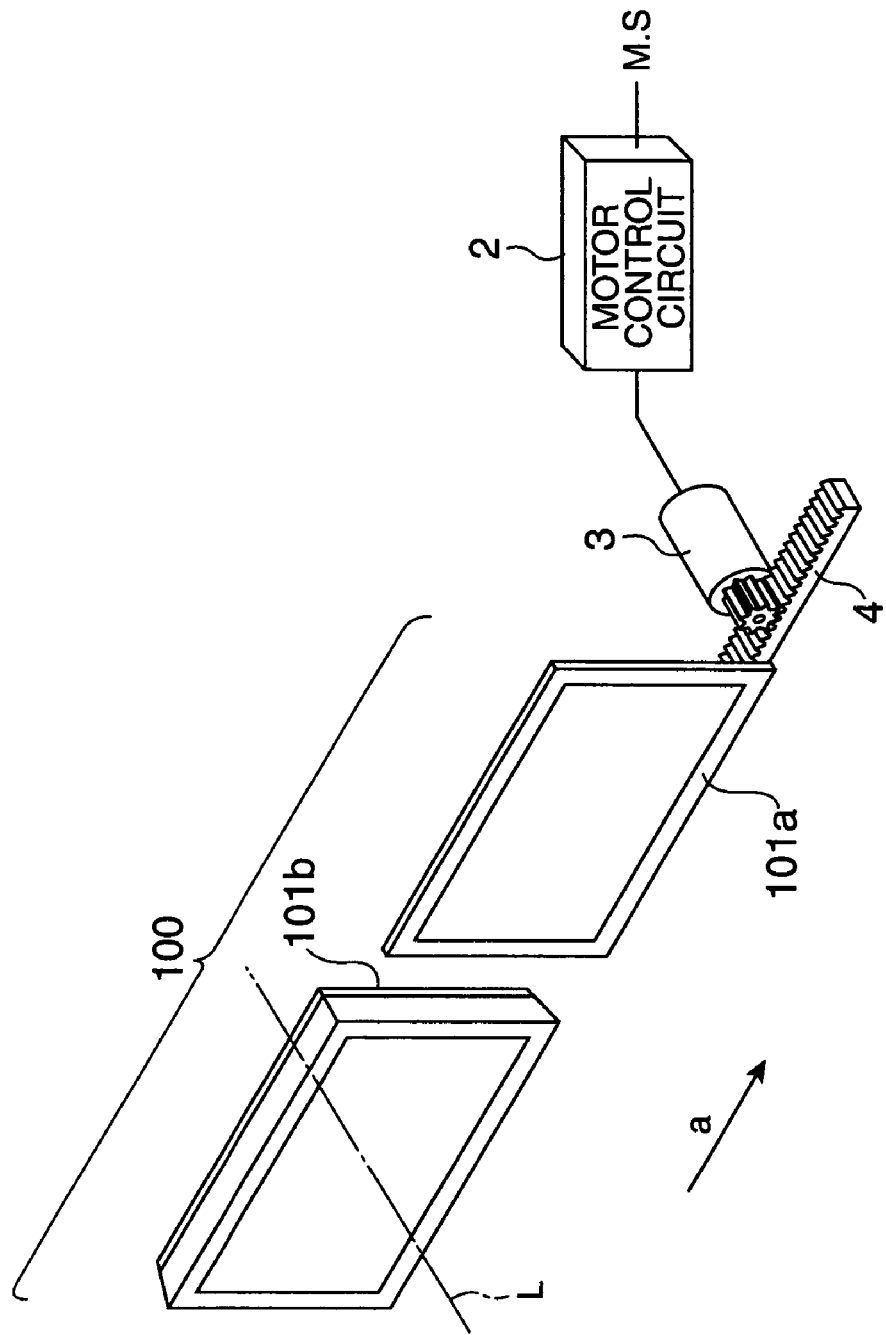
FIG. 6 shows a modified example of the projector in the first embodiment of the invention.

For example, as shown in FIG. 6, only the polarizer 101a of the liquid crystal light valve 100 (light incident-side polarizer) may be moved off the light path L by connecting only the polarizer 101a to the moving mechanism 1.

Here, the projector PJ1 of the embodiment includes the liquid crystal light valves 60R, 60G, and 60B as the first optical modulation devices. Accordingly, the polarization direction of the light output from the liquid crystal light valves 60R, 60G, and 60B and entering the liquid crystal light valve 100 as the second optical modulation device is aligned nearly in one direction. Therefore, if the polarization direction of light is in parallel with the transmission axis of the polarizer 101a, even when only the polarizer 101a is moved off the light path L, the lights modulated by the liquid crystal light valves 60R, 60G, and 60B can be further brightness modulated by driving the liquid crystal light valve 100.

However, since the lights output from the liquid crystal light valves 60R, 60G, and 60B reach the liquid crystal light valve 100 via the optical system (the cross dichroic prism 80 and the relay lens 90) on the way, the polarization directions thereof are not completely aligned in one direction. On this account, the entire light, part of which is normally blocked by the polarizer 101a, enters the liquid crystal light valve 100 because the polarizer 101a is moved off the light path L, and thereby, the display characteristic of the projector PJ1 can be made brighter. On the other hand, since there are variations in polarization direction of the light entering the liquid crystal light valve 100, the effect of brightness modulation in the liquid crystal light valve 100 is degraded.

Specifically, in the case where both the polarizer 101a and the polarizer 101b are in the light path L and brightness modulation is performed by the liquid crystal light valve 100, the contrast is about 250000:1. On the other hand, in the case where only the polarizer 101a is moved off the light path L and brightness modulation is performed by the liquid crystal light valve 100, the contrast is about 10000:1. For comparison, in the case where both the polarizer 101a and the polarizer 101b are moved off the light path L and no brightness modulation is performed by the liquid crystal light valve 100, the contrast is about 500:1.

Further, assuming that the brightness in the case where the both the polarizer 101a and the polarizer 101b are in the light path L and brightness modulation is performed by the liquid crystal light valve 100 is 100%, the brightness in the case where only the polarizer 101a is moved off the light path L and brightness modulation is performed by the liquid crystal light valve 100 is about 115%, and the brightness in the case where both the polarizer 101a and the polarizer 101b are moved off the light path L and no brightness modulation is performed by the liquid crystal light valve 100 is about 150%.

Second Embodiment

Next, the second embodiment of the invention will be described. In the description of the second embodiment, regarding the same parts as those in the first embodiment, the description thereof will be omitted or simplified.

Figure 7:
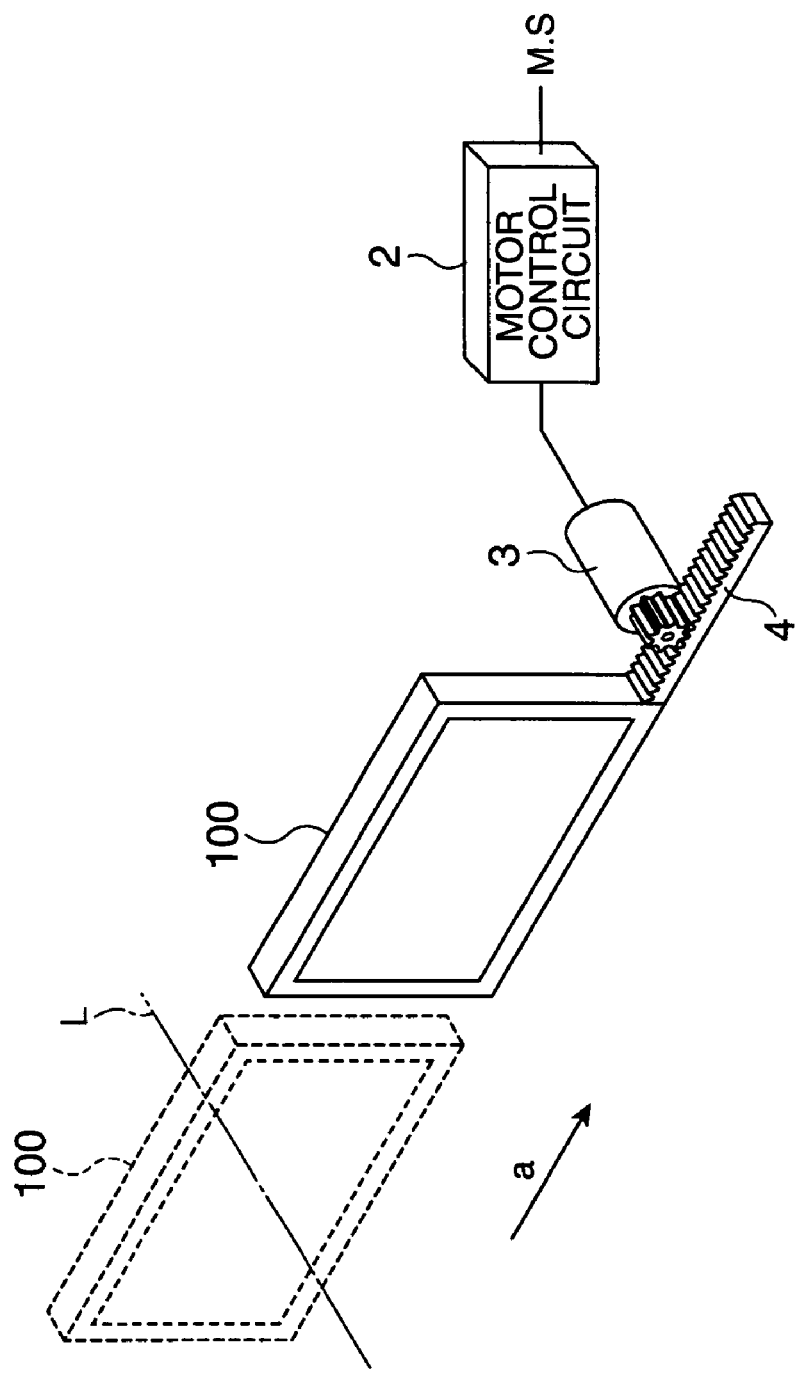
FIG. 7 shows a schematic configuration of a moving mechanism provided to a projector in the second embodiment of the invention.

FIG. 7 shows a schematic configuration of a moving mechanism provided to a projector of the embodiment. As shown in the drawing, in the moving mechanism provided to the projector of the embodiment, the slide gear 4 is connected not only to the polarizers 101a and 101b but also the liquid crystal light valve 100 itself.

In the projector of the embodiment having such a configuration, when an external request is made, the liquid crystal light valve 100 itself is moved off the light path L. Further, the projector of the embodiment having the configuration can change display characteristics according to the use environment as is the case of the projector PJ1 of the first embodiment.

Third Embodiment

Next, the third embodiment of the invention will be described. Also, in the description of the third embodiment, regarding the same parts as those in the first embodiment, the description thereof will be omitted or simplified.

Figure 8:
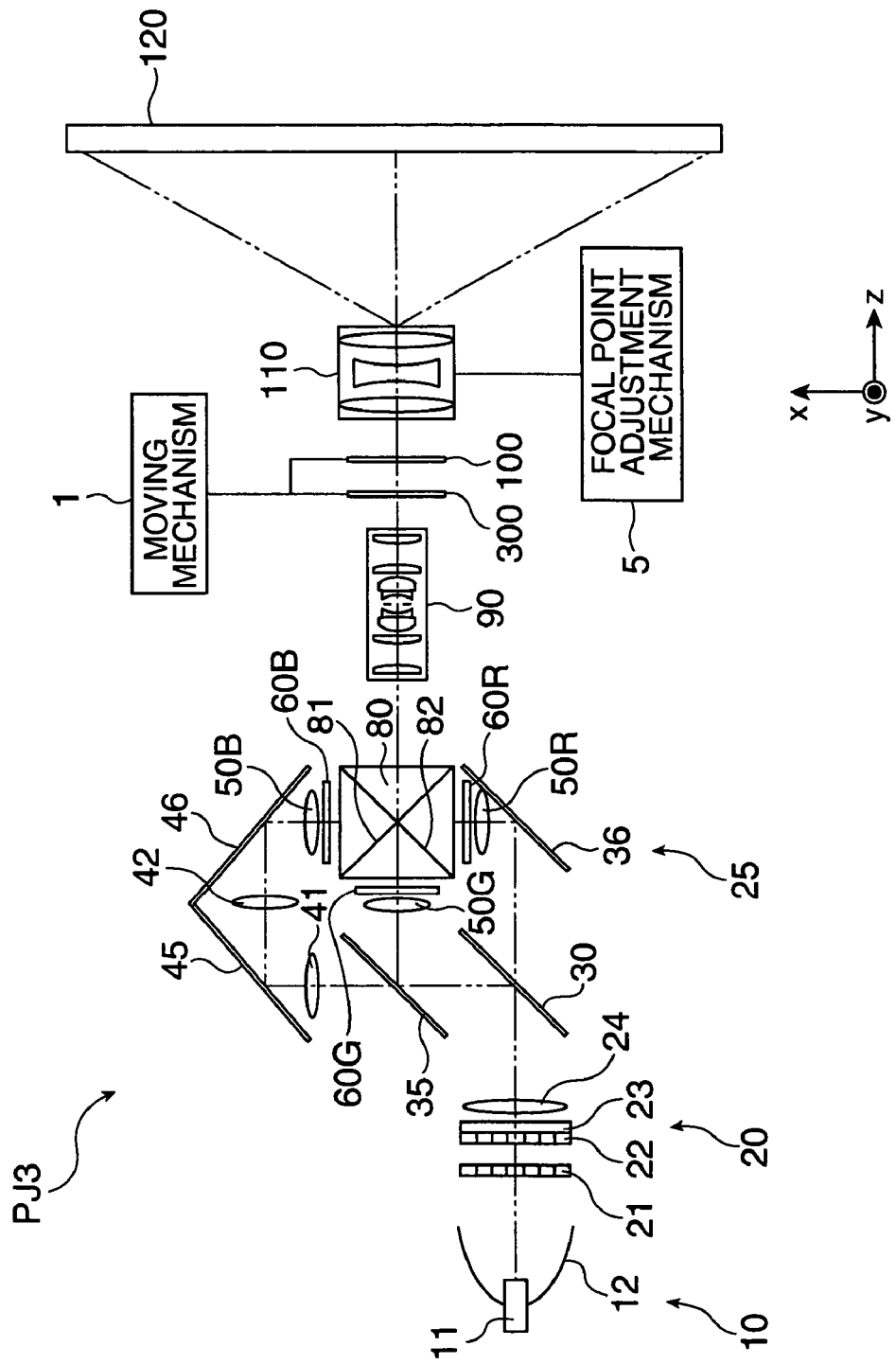
FIG. 8 shows a main optical configuration of a projector in the third embodiment of the invention.

FIG. 8 shows a main optical configuration of projector PJ3 of the embodiment.

Figure 9:
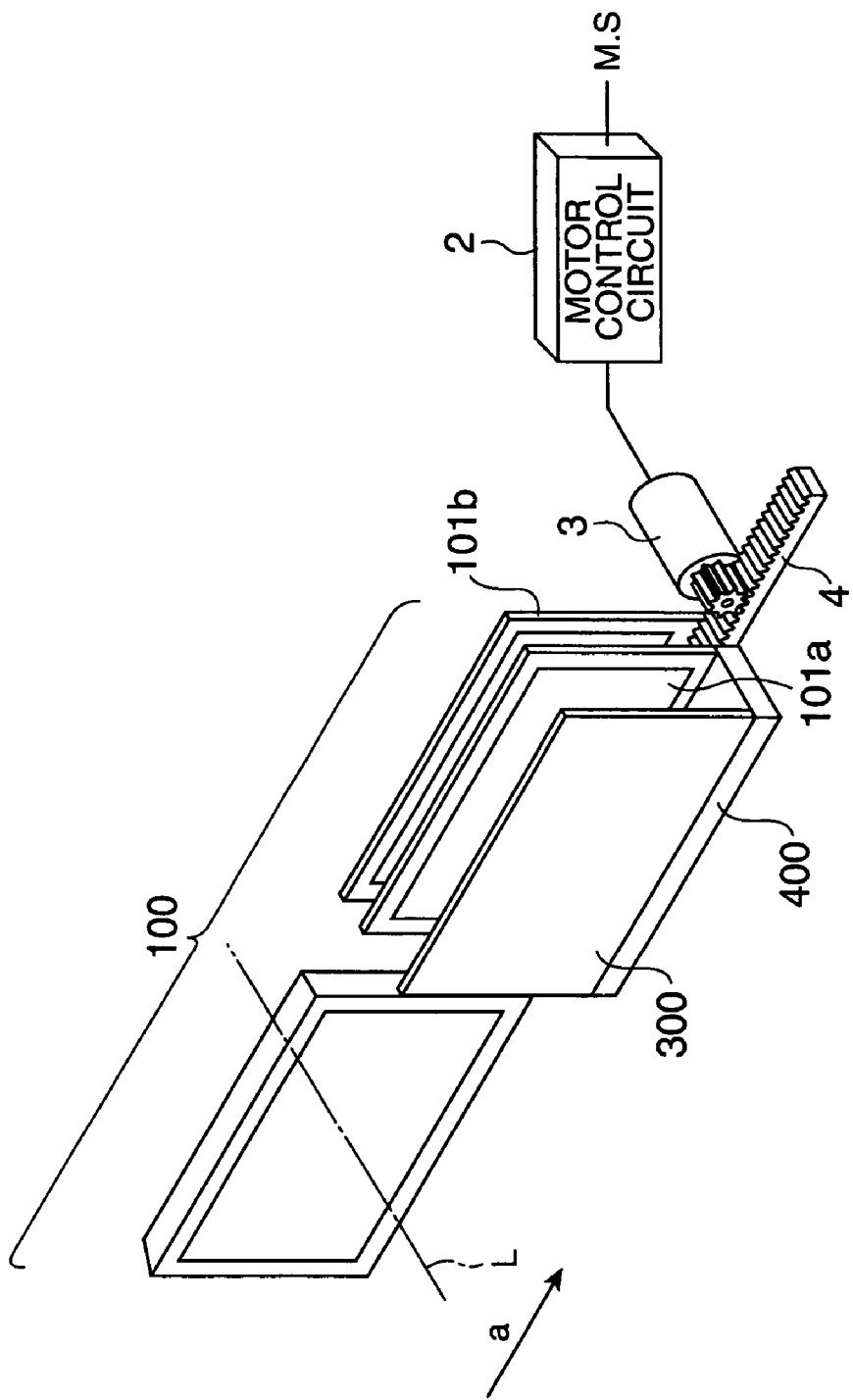
FIG. 9 shows a schematic configuration of a moving mechanism.

As shown in the drawing, the projector PJ3 of the embodiment has a configuration in which a wavelength selective retardation film 300 is provided between the relay lens 90 and the liquid crystal light valve 100. Further, as shown in a schematic configuration of the moving mechanism 1 in FIG. 9, in the projector PJ3 of the embodiment, the slide gear 4 of the moving mechanism 1 is connected not only to the polarizers 101a and 101b but also to the wavelength selective retardation film 300 via a fixing plate 400.

For example, in the case of a 3-LCD projector like the projector PJ3 of the embodiment in which illumination lights of the respective colors of RGB are modulated by the three liquid crystal light valves 60R, 60G, and 60B, in view of combination efficiency in the cross dichroic prism 80, sometimes the polarization directions of the illumination lights modulated by the respective liquid crystal light valves are not unified. On this account, when the illumination lights modulated by the respective liquid crystal light valves 60R, 60G, and 60B are combined and entered into the liquid crystal light valve 100, it is necessary to unify the polarization directions of the illumination lights modulated by the respective liquid crystal light valves 60R, 60G, and 60B.

Accordingly, specifically, the retardation film 300 having wavelength selectivity is provided between the liquid crystal light valves 60R, 60G, and 60B and the liquid crystal light valve 100.

The wavelength selective retardation film 300 acts as a retardation film only on light with a predetermined wavelength (green illumination light in the embodiment), and does not act as a retardation film on lights with other wavelengths (red illumination light and blue illumination light in the embodiment). Accordingly, when the illumination light passes through the wavelength selective retardation film 300, only the polarization direction of light with a predetermined wavelength is changed, and the polarization directions of all lights are unified. As a result, the polarization directions of all illumination lights are unified and the lights can be entered into the liquid crystal light valve 100.

However, the illumination light loses some energy when it passes through the wavelength selective retardation film 300. Specifically, when the illumination light passes through the wavelength selective retardation film 300, part of the illumination light turns into heat and the intensity as the entire illumination light is reduced.

Therefore, in the case where the polarizers 101a and 101b of the liquid crystal light valve 100 are moved off the light path L of the light as is the case of the projector PJ3 of the embodiment, that is, in the case where the wavelength selective retardation film 300 is not required, display images can be made brighter by moving the polarizers 101a and 101b of the liquid crystal light valve 100 and the wavelength selective retardation film 300 as well off the light path L1 by driving the moving mechanism 1.

Fourth Embodiment

Next, the fourth embodiment of the invention will be described. In the description of the fourth embodiment, regarding the same parts as those in the first embodiment or the second embodiment, the description thereof will be omitted or simplified.

Figure 10:
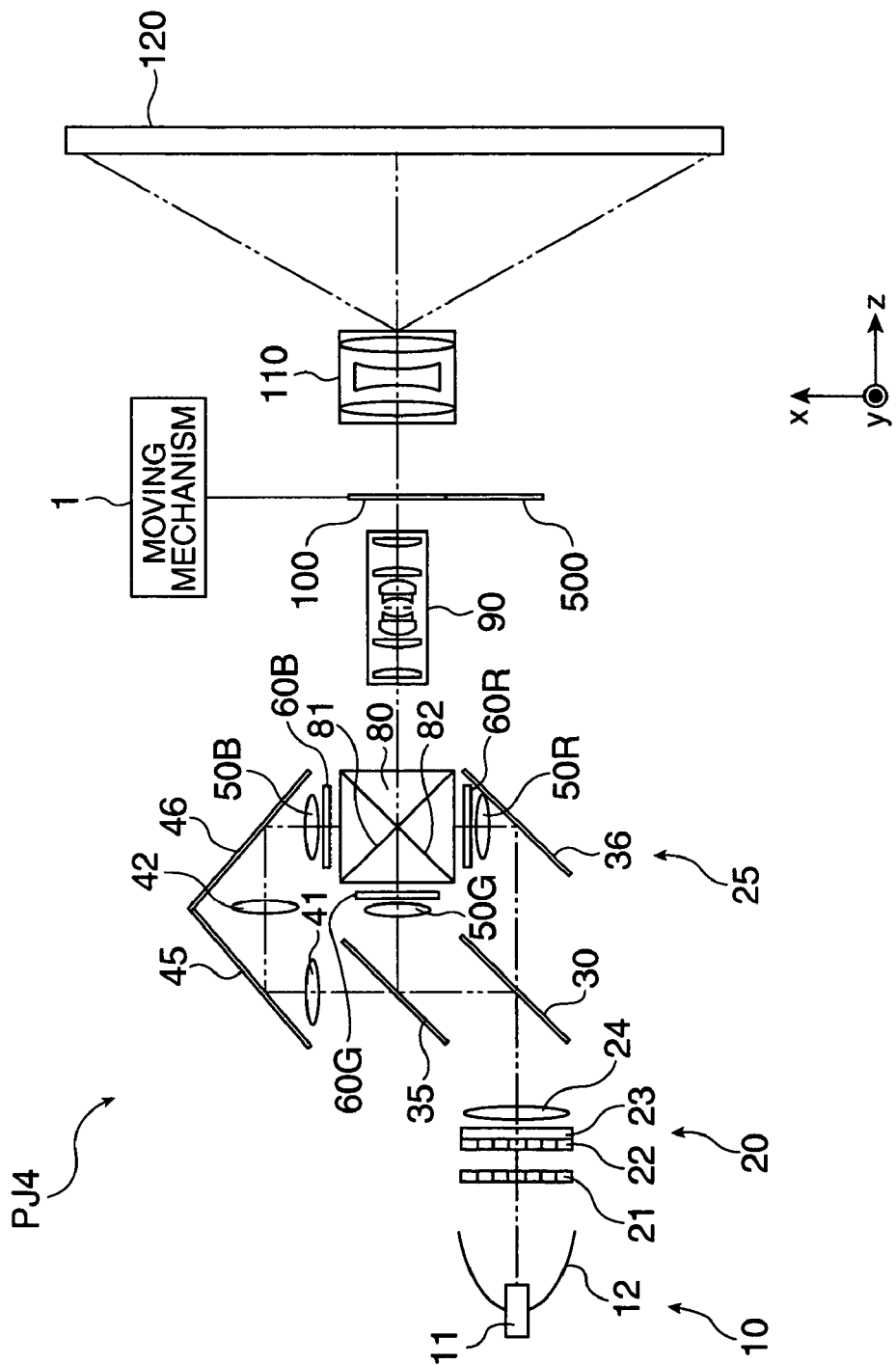
FIG. 10 shows a main optical configuration of a projector in the fourth embodiment of the invention.

FIG. 10 shows a main optical configuration of projector PJ4 of the embodiment.

As shown in the drawing, the projector PJ4 of the embodiment has a light path length adjustment optical device 500 formed integrally with the liquid crystal light valve 100, but no focal point adjustment mechanism 5 provided to the projector PJ1 of the embodiment 1.

The light path length adjustment optical device 500 is an optical device that adjusts the light path length of the illumination light, and is inserted in the light path L when the liquid crystal light valve 100 is moved off the light path L. Specifically, the light path length is adjusted by the light path length adjustment optical device 500 so that the light path length of the illumination light may not change even when the liquid crystal light valve 100 is moved off the light path L.

According to the projector PJ4 of the embodiment, the light path length is adjusted by the light path length adjustment optical device 500 so that the light path length of the illumination light may not change even when the liquid crystal light valve 100 is moved off the light path L. Therefore, focused image can be displayed on the screen 120 without adjusting the focal point of the projection lens 110 by the focal point adjustment mechanism.

As the light path length adjustment optical device 500, optical glass having transparency to the illumination light, dielectric multilayer glass that functions as a color filter, or the like may be used. In the case where the dielectric multilayer glass is used for the light path length adjustment optical device 500, the light path length of the illumination light can be adjusted and the color temperature correction of the illumination light can be performed by the light path length adjustment optical device 500.

Figure 11:
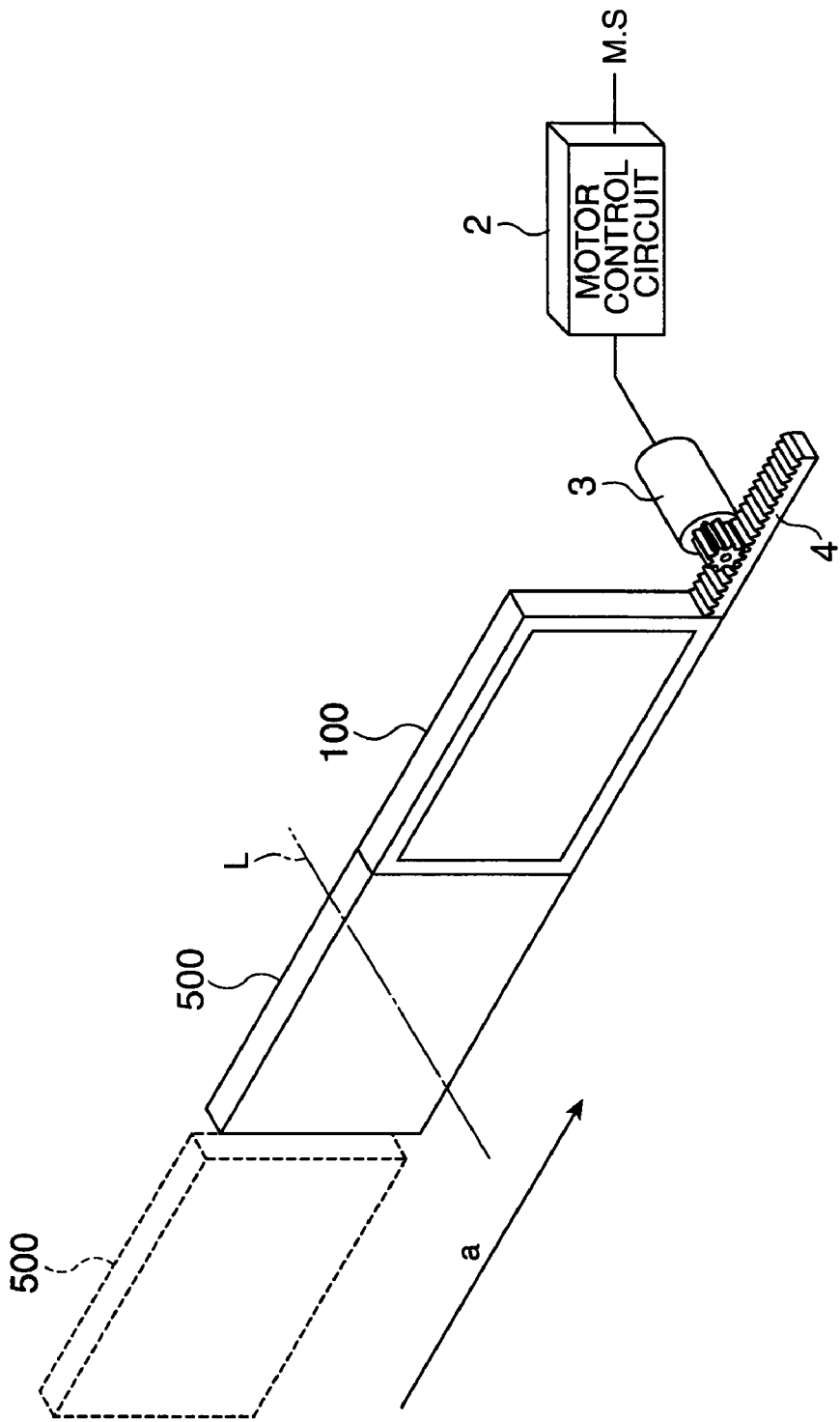
FIG. 11 shows a schematic configuration of a moving mechanism.

Further, in the projector PJ4 of the embodiment, as shown in a schematic configuration of the moving mechanism 1 in FIG. 11, the liquid crystal light valve 100 and the light path length adjustment optical device 500 as optical devices are integrally formed by being serially connected in a direction in which the liquid crystal light valve 100 is moved by the moving mechanism 1. Accordingly, the light path length adjustment optical device 500 may be located in the light path L at the same time when the liquid crystal light valve 100 is moved off the light path L. Therefore, there is no need to separately provide a mechanism of moving the light path length adjustment optical device 500. Note that, in the projector PJ4 of the embodiment, the moving mechanism 1 is also included in component elements of the light path length adjustment unit of the invention, and the light path length adjustment unit of the invention is formed by the moving mechanism 1 and the light path length adjustment optical device 500.

Figure 12:
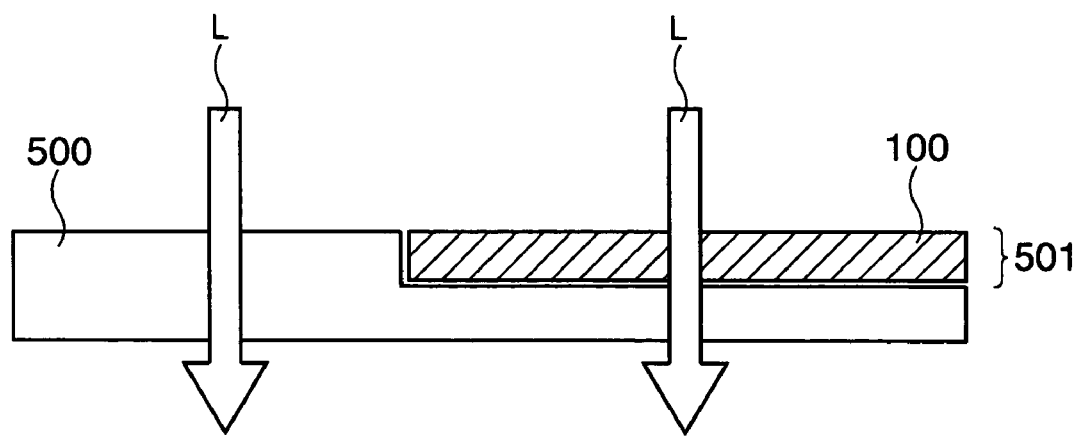
FIG. 12 is a sectional view of a liquid crystal light valve and a light path length adjustment optical device.

In the case where the liquid crystal light valve 100 and the light path length adjustment optical device 500 are integrally formed, as shown in a sectional view of FIG. 12, the configuration of integral formation in which the liquid crystal light valve 100 is bonded to a step portion 501 formed in the light path length adjustment optical device may be adopted.

By adopting the configuration, the light path length when the liquid crystal light valve 100 is located in the light path L and the light path length when the light path length adjustment optical device 500 is located in the light path L can be adjusted easily by adjusting the height of the step portion 501. Further, in the case where an optical device other than the liquid crystal light valve 100 is used, positioning can be performed easily by adjusting the optical device to the step portion 501 and the replacement work can be facilitated.

Fifth Embodiment

Next, the fifth embodiment of the invention will be described. Also, in the description of the fifth embodiment, regarding the same parts as those in the first embodiment, the description thereof will be omitted or simplified.

Figure 13:
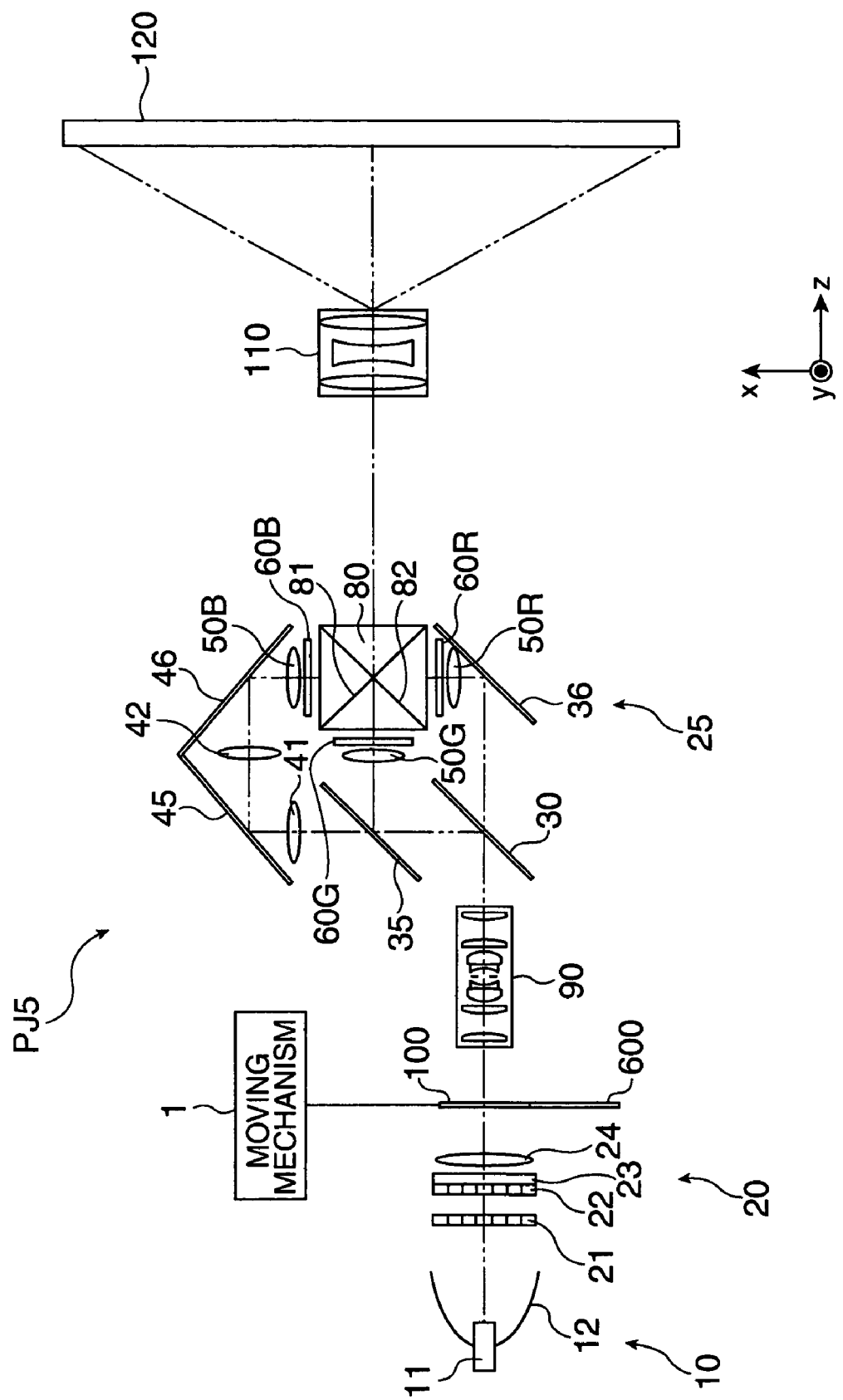
FIG. 13 shows a main optical configuration of a projector in the fifth embodiment of the invention.

FIG. 13 shows a main optical configuration of projector PJ5 of the embodiment.

As shown in the drawing, in the projector PJ5 of the embodiment, the relay lens 90 and the liquid crystal light valve 100 are provided between the condenser lens 24 and the dichroic mirror 30. Note that, in the projector PJ5 of the embodiment, the liquid crystal light valve 100 and the relay lens 90 are sequentially arranged in the traveling direction of light.

In the projector PJ5 of the embodiment having such a configuration, the light brightness-modulated by the liquid crystal light valve 100 is entered into the respective liquid crystal light valves 60R, 60G, and 60B via the relay lens 90, and color-modulated in the respective liquid crystal light valves 60R, 60G, and 60B. That is, in the projector PJ5 of the embodiment, the first optical modulation device of the invention is formed by the liquid crystal light valve 100, and the second optical modulation device of the invention is formed by the liquid crystal light valves 60R, 60G, and 60B.

Further, the moving mechanism 1 is coupled to the liquid crystal light valve 100, and the liquid crystal light valve 100 itself can be moved off the light path L.

Also, in the projector PJ5 of the embodiment, since the liquid crystal light valve 100 itself as an optical device that causes great light loss can be moved from the light path L, the display characteristic of the projector PJ5 can be made brighter by moving the liquid crystal light valve 100 off the light path L.

Further, as shown in FIG. 13, a retardation film 600 (halfwave plate) is integrally formed with the liquid crystal light valve 100. The retardation film 600 is for changing the polarization direction of incident light and is inserted into the light path L when the liquid crystal light valve 100 is moved off the light path L.

The polarization direction of the light incident to the liquid crystal light valve 100 is aligned by the polarization conversion element 23, and the polarization direction is changed when output from the liquid crystal light valve 100. Here, when liquid crystal light valve 100 is moved off the light path L, since the polarization direction of the light is not changed, the light can not enter the liquid crystal light valves 60R, 60G, and 60B, in the subsequent stage. On this account, when liquid crystal light valve 100 is moved off the light path L, the light is converted into the light in the polarization direction, which can enter the liquid crystal light valves 60R, 60G, and 60B by inserting the retardation film 600 into the light path L.

In the embodiment, the liquid crystal light valve 100 itself is moved. However, the invention is not limited to that, and only the polarizers 101a and 101b of the liquid crystal light valve 100 may be moved by the moving mechanism 1.

Sixth Embodiment

Next, the sixth embodiment of the invention will be described. Also, in the description of the sixth embodiment, regarding the same parts as those in the first embodiment, the description thereof will be omitted or simplified.

While the optical device and the light path L are relatively moved by moving the optical device in the projectors of the above described first to fifth embodiments, the optical device (liquid crystal light valve 100) and the light path L are relatively moved by moving the light path L in the projector of the embodiment.

Figure 14:
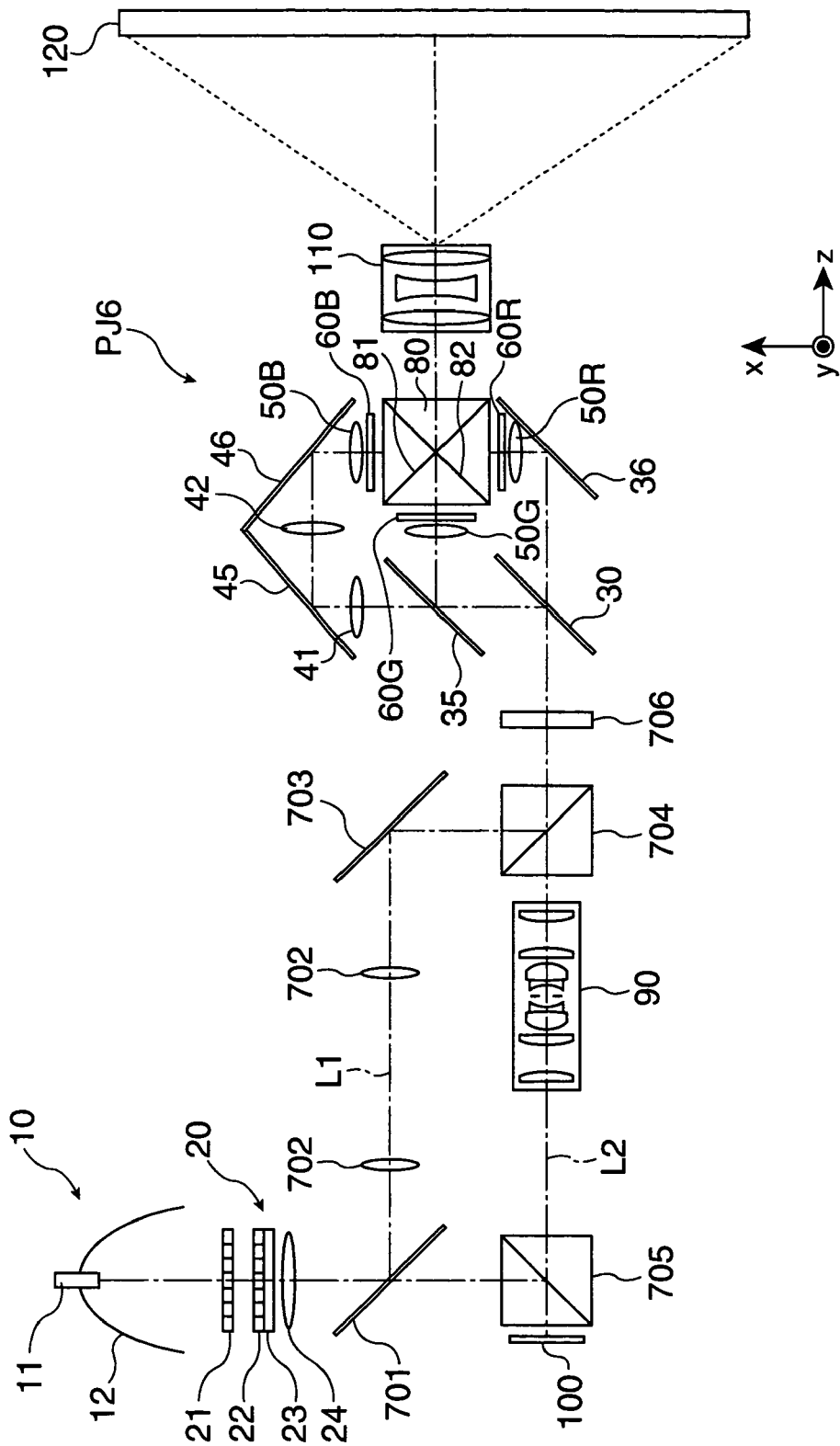
FIG. 14 shows a main optical configuration of a projector in the sixth embodiment of the invention.

FIG. 14 shows a main optical configuration of projector PJ6 of the embodiment.

As shown in the drawing, in the projector PJ6 of the embodiment, the light path L between the condenser lens 24 and the dichroic mirror 30 is divided into light path L1 and light path L2. In the projector PJ6 of the embodiment, it is assumed that the light output from the polarization conversion element 23 is s-polarized light and the light that can enter the liquid crystal light valves 60R, 60G, and 60B is p-polarized light.

The projector PJ6 of the embodiment includes a movable reflection mirror 701 (an optical device moving unit) that can move relatively to the light path L and guides the light to the light path L1 by reflecting the light in the light path L. That is, when the movable reflection mirror 701 is located in the light path L, the light is guided to the light path L1, and, when the movable reflection mirror 701 is not located in the light path L, the light is guided to the light path L2.

Plural relay lenses 702 and a reflection mirror 703 are provided in the light path L1, and the light guided to the light path L1 is guided to a polarization beam splitter 704 by the optical system.

On the other hand, a polarization beam splitter 705 that reflects s-polarized light to the liquid crystal light valve 100 side and the relay lens 90 are provided in the light path L2, and the light guided to the light path L2 is guided to the polarization beam splitter 704 by the optical system. Note that, in the embodiment, the liquid crystal light valve 100 is formed as a reflective liquid crystal light valve.

The polarization beam splitter 704 reflects s-polarized light to guide it to the dichroic mirror 30 side, and transmits p-polarized light to guide it to the dichroic mirror 30 side.

Further, a movable retardation film 706 is provided between the polarization beam splitter 704 and the dichroic mirror 30, which is located in the light path L when the light passes through light path L1 (when the movable reflection mirror 701 is located in the light path L).

In the projector PJ6 of the embodiment having such a configuration, the light is guided to the light path L1 when the movable reflection mirror 701 is moved to the light path L. Then, the light (s-polarized light) guided to the light path L1 is guided to the polarization beam splitter 704 by the plural relay lenses 702 and the reflection mirror 703. Here, since the polarization beam splitter 704 is for reflecting the s-polarized light to guide it to the dichroic mirror 30 side, the light guided to the polarization beam splitter 704 via the light path L1 is reflected by the polarization beam splitter 704 and guided to the dichroic mirror 30 side. Further, when the movable reflection mirror 701 is located in the light path L, the movable retardation film 706 is located in the light path L, and thereby, the light output from the polarization beam splitter 704 is changed to p-polarized light that can enter the liquid crystal light valves 60R, 60G, and 60B by the movable retardation film 706 and output.

On the other hand, when the movable reflection mirror 701 is moved off the light path L, the light is guided to the light path L2. Then, the light that has been guided to the light path L2 is guided to the liquid crystal light valve 100 by the polarization beam splitter 705, brightness-modulated, and then, guided to the polarization beam splitter 704 via the relay lens 90. Since the light guided to the polarization beam splitter 704 through the light path L2 has been changed to p-polarized light by the liquid crystal light valve 100, the light is transmitted through the polarization beam splitter 704 and guided to the dichroic mirror 30 side.

In the projector PJ6 of the embodiment, by guiding the light into the light path L1, that is, moving the light path, the liquid crystal light valve 100 can be moved off the light path. Therefore, the display characteristic can be made brighter as is the case of the projector of the first embodiment by guiding the light into the light path L1.

Further, in the projector PJ6 of the embodiment, since the light that has been modulated by the liquid crystal light valve 100 is modulated by the respective liquid crystal light valves 60R, 60G, and 60B, the first optical modulation device of the invention is formed by the liquid crystal light valve 100, and the second optical modulation device of the invention is formed by the liquid crystal light valves 60R, 60G, and 60B.

Seventh Embodiment

Next, the seventh embodiment of the invention will be described. Since the seventh embodiment is a modified example of the sixth embodiment, regarding the same parts as those in the sixth embodiment, the description thereof will be omitted or simplified.

Figure 15:
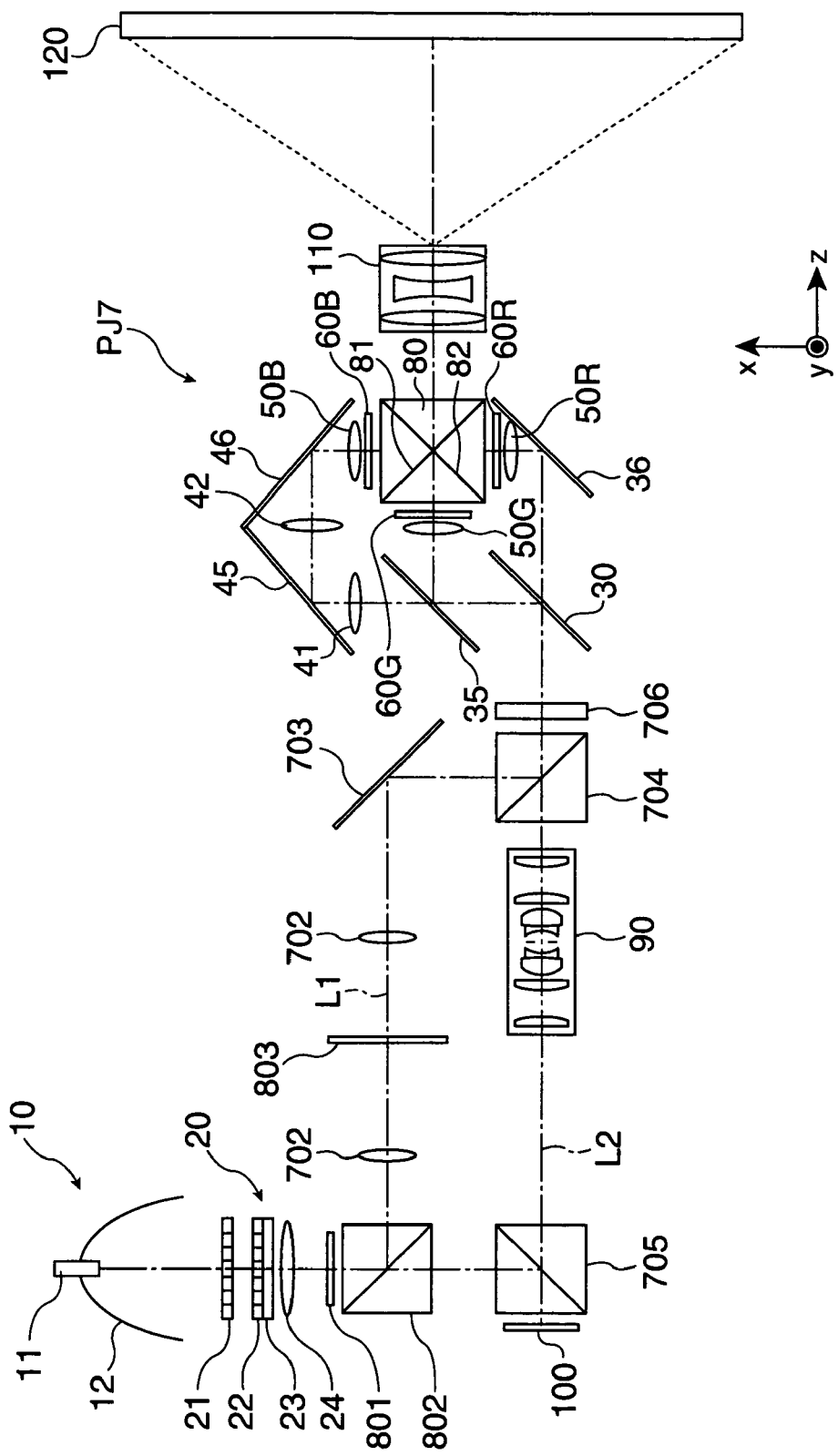
FIG. 15 shows a main optical configuration of a projector in the seventh embodiment of the invention.

FIG. 15 shows a main optical configuration of projector PJ7 of the embodiment.

As shown in the drawing, the projector PJ7 of the embodiment includes a movable retardation film 801 that can move relatively to the light path L and a polarization beam splitter 802 in place of the movable reflection mirror 701 provided in the projector PJ6 of the embodiment. That is, in the projector PJ7 of the embodiment, the optical device moving unit of the invention is formed by the movable retardation film 801 and the polarization beam splitter 802.

The polarization beam splitter 802 reflects p-polarized light to guide it to the light path L1, and transmits s-polarized light to guide it to the light path L2.

For the purpose, in the projector PJ7 of the embodiment, the movable retardation film 801 is located in the light path L, and s-polarized light output from the condenser lens 24 is changed to p-polarized light, reflected at the polarization beam splitter 802, and guided to the light path L1.

On the other hand, when the movable retardation film 801 is moved off the light path L, s-polarized light output from the condenser lens 24 is transmitted thorough the polarization beam splitter 802, and guided to the light path L2.

That is, according to the projector PJ7 of the embodiment, the light path can be moved by moving the movable retardation film 801.

By the way, in the embodiment, since the light guided to the light path L1 is p-polarized light, it is necessary to return the light to the s-polarized light. For the purpose, a retardation film 803 is provided in the light path L1.

As described above, the preferred embodiments of the projector according to the embodiment have been described by referring to the accompanying drawings, however, needless to add, the invention is not limited to the embodiments. Forms, combinations, etc. of the respective component members are shown in the above described embodiments by way of example only, various changes can be made based on design requirements etc. without departing from the scope of the invention.

For example, in the first embodiment, only the polarizer 101a, 101b or the liquid crystal light valve 100 has been moved by the moving mechanism. However, the invention is not limited to that, but also the relay lens 90 may be moved by the moving mechanism simultaneously with the polarizer 101a, 101b or the liquid crystal light valve 100.

Further, the moving direction and moving method of the polarizers 101a and 101b or the liquid crystal light valve 100 are arbitrary.

Furthermore, in the embodiments, a transmissive liquid crystal light valve has been used as the optical modulation device. However, the invention is not limited to that, but also a reflective liquid crystal light valve or micromirror array device may be used as the optical modulation device.

Moreover, for example, the invention can be applied to a so-called rear projector in which the screen of the embodiments is exposed at part of the housing, the components other than the screen of the embodiments are accommodated within the housing, and images are displayed by rear projection from inside of the housing to the screen.

The entire disclosure of Japanese Patent Application Nos: 2005-085838, filed Mar. 24, 2005 and 2005-316276, filed Oct. 31, 2005 and 2006-029343, filed Feb. 7, 2006 are expressly incorporated by reference herein.

What is claimed is:

1. A projector comprising:
a first light modulation device that modulates illumination light;
a second light modulation device that further modulates the illumination light modulated by the first light modulation device;
a projection unit that projects the modulated illumination light toward a screen; and
an optical device moving unit that moves an optical device blocking at least part of the illumination light relatively to a light path of the illumination light to move the device off the light path;
wherein the second light modulation device is a transmissive liquid crystal light valve, and the optical device is a polarizer provided to the second light modulation device.

2. The projector according to claim 1, further comprising a controller that turns the full area of a liquid crystal panel provided to the second light modulation device white when the optical device is moved off the light path.

3. A projector comprising:
a first light modulation device that modulates illumination light;
a second light modulation device that further modulates the illumination light modulated by the first light modulation device;
a projection unit that projects the modulated illumination light toward a screen;
an optical device moving unit that moves an optical device blocking at least part of the illumination light relatively to a light path of the illumination light to move the device off the light path; and
a focal point adjustment unit that adjusts a focal distance of the projection unit when the optical device is moved off the light path.

4. The projector according to claim 3, the focal point adjustment unit adjusts the focal distance by performing adjustment within the projection unit.

5. A projector comprising:
a first light modulation device that modulates illumination light;
a second light modulation device that further modulates the illumination light modulated by the first light modulation device;
a projection unit that projects the modulated illumination light toward a screen; and
an optical device moving unit that moves an optical device blocking at least part of the illumination light relatively to a light path of the illumination light to move the device off the light path;
wherein the first light modulation device and the second light modulation device are liquid crystal light valves, and the optical device is a light incident-side polarizer provided to the second light modulation device.

* * * * *